United States Patent [19]

Fukushima et al.

[11] Patent Number: 5,111,444
[45] Date of Patent: May 5, 1992

[54] METHOD OF MANAGING DEFECTIVE SECTORS IN A DISK-SHAPED INFORMATION RECORDING MEDIUM AND AN APPARATUS FOR PERFORMING THE SAME

[75] Inventors: Yoshihisa Fukushima, Osaka; Isao Satoh, Neyagawa, both of Japan

[73] Assignee: Matsushita Electric Industrial Co., Ltd., Osaka, Japan

[21] Appl. No.: 379,462

[22] Filed: Jul. 13, 1989

[30] Foreign Application Priority Data

Jul. 13, 1988 [JP] Japan ................ 63-174518

[51] Int. Cl.$^5$ ........................ G11B 3/90
[52] U.S. Cl. ...................... 369/58; 369/32; 369/54; 369/59
[58] Field of Search ............ 369/32, 54, 59, 83, 369/84, 58; 360/48

[56] References Cited

U.S. PATENT DOCUMENTS

| 4,791,623 | 12/1988 | Deiotte ............... | 369/59 |
| 4,811,124 | 3/1989 | Dujari et al. ......... | 369/54 |
| 4,814,903 | 3/1989 | Kulakowski et al. ... | 369/59 |

FOREIGN PATENT DOCUMENTS

WO8400628 2/1987 PCT Int'l Appl. .

Primary Examiner—Roy N. Envall, Jr.
Assistant Examiner—Nabil Hindi
Attorney, Agent, or Firm—Panitch Schwarze Jacobs & Nadel

[57] ABSTRACT

A method of and an apparatus for managing defective sectors in an information recording medium such as a write-once optical disk and rewritable optical disk in which many defective sectors may be generated and unevenly distributed. In the medium, primary alternative zones are formed which are composed of: a prime area for recording user data the capacity of which is variable according to the volume capacity and partition capacity and the occurrence rate of defective sectors; a primary spare area for recording alternative sectors; and a primary defect list area for recording a primary defect list. Many defective sectors are managed in the units of alternative zones. When defective sectors cannot be substituted in an alternative zone (e.g., when defective sectors are locally concentrated), defective sectors are managed hierarchically using a secondary alternative zone, thereby reducing the amount of information to be handled for the management of defective sectors. Therefore, the size of the apparatus can be reduced, and defective sectors can be rapidly searched.

22 Claims, 10 Drawing Sheets ic disk and floppy disk, the file management including the defective sector management is effected by using, for example, the MS-DOS (trademark) of Microsoft Corp. which is known as a general-purpose OS for a personal computer. In the MS-DOS, a directory area for recording management information and a data area for recording file data are formed on the medium. A file allocation table (FAT) area is also formed in the medium to record an FAT for controlling the status of the data area which is divided in cluster units. Each entry of the FAT (hereinafter, referred to as "an FAT entry") which corresponds to each of the clusters one by one manages the status information (used/unused) of each cluster and the linkage information of a plurality of clusters which are used in recording a file. In such a medium, a defective sector may occur due to flaws, contamination or deterioration of the recording material. When a cluster contains a defective sector, an identification flag is recorded in the FAT entry corresponding to the cluster, to manage such a defective sector. When a medium is formatted to initialize FAT entries, an unused flag meaning that a cluster is unused is recorded in FAT entries corresponding to clusters containing no defective sector, and a defect flag in FAT entries corresponding to clusters containing a defective sector. When recording a new file, FAT entries having the unused flag the number of which corresponds to the size of the new file are sequentially retrieved from the beginning of an FAT. In this operation, FAT entries having the defect flag are skipped so that defective sectors will not be used in recording the new file. After the data of the new file are recorded in unused clusters, the FAT is updated by rewriting the linkage information which describes the new status of the linkage of the clusters.

METHOD OF MANAGING DEFECTIVE SECTORS IN A DISK-SHAPED INFORMATION RECORDING MEDIUM AND AN APPARATUS FOR PERFORMING THE SAME

BACKGROUND OF THE INVENTION

1. Field of the invention

This invention relates to a method of recording and reproducing information in which information is recorded in and reproduced from a diskshaped information recording medium in sector units or on a sector by sector basis, and to an apparatus for performing the same.

2. Description of the prior art

In a conventional information recording and reproducing apparatus using an information recording medium (hereinafter, referred to as merely "a medium") such as a magnetic disk and floppy disk, the file management including the defective sector management is effected by using, for example, the MS-DOS (trademark) of Microsoft Corp. which is known as a general-purpose OS for a personal computer. In the MS-DOS, a directory area for recording management information and a data area for recording file data are formed on the medium. A file allocation table (FAT) area is also formed in the medium to record an FAT for controlling the status of the data area which is divided in cluster units. Each entry of the FAT (hereinafter, referred to as "an FAT entry") which corresponds to each of the clusters one by one manages the status information (used/unused) of each cluster and the linkage information of a plurality of clusters which are used in recording a file. In such a medium, a defective sector may occur due to flaws, contamination or deterioration of the recording material. When a cluster contains a defective sector, an identification flag is recorded in the FAT entry corresponding to the cluster, to manage such a defective sector. When a medium is formatted to initialize FAT entries, an unused flag meaning that a cluster is unused is recorded in FAT entries corresponding to clusters containing no defective sector, and a defect flag in FAT entries corresponding to clusters containing a defective sector. When recording a new file, FAT entries having the unused flag the number of which corresponds to the size of the new file are sequentially retrieved from the beginning of an FAT. In this operation, FAT entries having the defect flag are skipped so that defective sectors will not be used in recording the new file. After the data of the new file are recorded in unused clusters, the FAT is updated by rewriting the linkage information which describes the new status of the linkage of the clusters.

In a medium such as a write-once optical disk in which recorded information cannot be rewritten, the contents stored in one region of an FAT cannot be updated in the same region. Therefore, the aforedescribed management technique of a defective sector in a conventional file management system is not applicable to such a medium.

A medium such as a rewritable optical disk in which recorded information can be rewritten incurs a possibility that the occurrence of a defective sector may suddenly increase after the rewrite operation has been conducted tens or hundreds of thousands times. In such a medium, an FAT area is rewritten on each record or update operation so that the number of rewriting the FAT becomes extremely large, resulting in a greater possibility that a defective sector will occur in the FAT. However, a conventional file management system has no alternative means for a defective sector which may occur in an FAT area, thereby causing two FATs recorded to be recorded in a same FAT area. When a defective sector exists in an FAT area having an FAT, another FAT may be recorded in addition to the FAT, thereby causing both the FATs to be disabled for reproducing. Therefore, a conventional file management system using an FAT cannot be applied to an information recording medium such as a write-once optical disk or rewritable optical disk in which the number of rewriting information is limited.

SUMMARY OF THE INVENTION

Thus, the invention described herein makes possible the objectives of:

(1) providing a method of managing defective sectors in a disk-shaped information recording medium which can manage defective sectors even when the medium is a non-rewritable one;

(2) providing a method of managing defective sectors in a disk-shaped information recording medium which can manage defective sectors even when the number of rewriting the contents of the medium is limited;

(3) providing an apparatus for managing defective sectors in a disk-shaped information recording medium which can manage defective sectors even when the medium is a non-rewritable one; and (4) providing an apparatus for managing defective sectors in a disk-shaped information recording medium which can manage defective sectors even when the number of rewriting the contents of the medium is limited.

The method of managing defective sectors in a disk-shaped information recording medium of this invention, which overcomes the above-discussed and numerous other disadvantages and deficiencies of the prior art, comprises the steps of allocating at least one primary alternative zone in said information recording medium, said alternative zone comprising: a prime area for recording user data, said prime area having a variable length which corresponds to the occurrence rate of defective sectors and to the volume capacity or partition capacity; a primary spare area for recording alternative sectors which substitute defective sectors; and a primary defect list area for recording a primary defect list of a fixed length, said primary defect list holding the relationship between defective sectors and alternative sectors, managing defective sectors in units of an alternative zone by substituting the defective sectors detected in said prime area with alternative sectors in said primary spare area, and by registering the defective sectors in said primary defect list, allocating a secondary alternative zone in said information recording medium, said secondary alternative zone comprising: a secondary spare area for recording alternative sectors for substituting defective sectors which cannot be substituted in said at least one primary alternative zone; and a secondary defect list area for recording a secondary defect list which holds the relationship between defective sectors and alternative sectors in said secondary spare area, managing hierarchically defective sectors by substituting defective sectors which cannot be substituted in said at least one primary alternative zone, with alternative sectors in said secondary zone, and by registering the defective sectors in said secondary defect list, and managing all areas formed in the volume by allocating a volume control area in said information recording medium, and by recording volume control data in said volume control area, said volume control data including control data of said at least one primary alternative zone, said partitions, said secondary alternative zone and an unused area.

In a preferred embodiment of the method of the invention, the volume control area is divided into a partition control area and an alternative zone control area, a partition control block holding control data necessary for the allocation of partitions and the recording and reproducing of a file is formed to be recorded in said partition control area, and an alternative zone control block having control data necessary for the recording and reproducing of data including the allocation of partitions and the substitution of defective sectors is formed to be recorded in said alternative zone control area.

In a preferred embodiment of the method of the invention, a defect control mode for identifying the operation mode of the defect management is recorded as one part of partition control data and alternative zone control data, thereby enabling the operation mode of the substitution management to be set in units of a partition.

In a preferred embodiment of the method of the invention, a volume control block for storing control data necessary for the operation of recording and reproducing data is generated to be recorded in said volume control area, said operation including the allocation of partitions, the recording and reproducing of a file, and the substitution of a defective sector.

In a preferred embodiment of the method of the invention, a defect control mode for identifying the operation mode of the defect management is recorded as one part of volume control data, thereby enabling the operation mode of the substitution management to be set in units of a partition.

In a preferred embodiment of the method of the invention, the substitution management is conducted while at least one partition is divided into a plurality of alternative zones, and a plurality of prime areas are arranged successively in said partition.

In a preferred embodiment of the method of the invention, the substitution management is conducted while at least one partition is divided into a plurality of alternative zones, and a plurality of primary defect list areas are arranged successively in said partition.

In a preferred embodiment of the method of the invention, the substitution management is conducted while at least one partition is divided into a plurality of alternative zones, and an operation of fetching a primary defect list of an alternative zone in a partition which zone contains a recording and reproducing area of data is followed by an operation of fetching a primary defect list of another alternative zone which is in said partition and follows said alternative zone.

In a preferred embodiment of the method of the invention, address information of an alternative sector to be used next in said primary spare area or secondary spare area is recorded in a header of said primary defect list or secondary defect list.

In a preferred embodiment of the method of the invention, the information recording medium is rewritable for a limited number of times, alternative sectors the number of which is greater than the maximum number of defective sectors registrable in said primary defect list or secondary defect list are allocated in said primary spare area or secondary spare area, and, when one of said alternative sectors is defective, the recording operation is executed using another one of said alternative sectors which has not been used.

In a preferred embodiment of the method of the invention, the information recording medium cannot be rewritten, sectors, the number of which equals the number of defective sectors registrable in said primary defect list or secondary defect list, are allocated in said primary defect list area or secondary defect list area, the updation of said primary defect list or secondary defect list is executed employing successively unused sectors in said primary defect list area or secondary defect list area, the sequence of employing unused sectors beginning at one end of said primary defect list area or secondary defect list area, and using a primary defect list or secondary defect list fetched from a sector which is positioned immediately before said employed unused sector.

The apparatus for recording and reproducing information using a disk-shaped information recording medium of this invention, comprises a means for allocating at least one primary alternative zone in said information recording medium, said alternative zone comprising: a prime area for recording user data, said prime area having a variable length which corresponds to the occurrence rate of defective sectors and to the volume capacity or partition capacity; a primary spare area for recording alternative sectors which substitute defective sectors; and a primary defect list area for recording a primary defect list of a fixed length, said primary defect list holding the relationship between defective sectors and alternative sectors, a means for managing defective sectors in units of an alternative zone by substituting the defective sectors detected in said prime area with alternative sectors in said primary spare area, and by registering the defective sectors in said primary defect list, a means for allocating a secondary alternative zone in said information recording medium, said secondary alternative zone comprising: a secondary spare area for recording alternative sectors for substituting defective sectors which cannot be substituted in said at least one primary alternative zone; and a secondary defect list area for recording a secondary defect list which holds the relationship between defective sectors and alternative sectors in said secondary spare area, a means for managing hierarchically defective sectors by substituting defective sectors which cannot be substituted in said at least one primary alternative zone, with alternative sectors in said secondary, zone, and by registering the defective sectors in said secondary defect list, and a means for managing all areas formed in the volume by allocating a volume control area in said information recording medium, and by recording volume control data in said volume control area, said volume control data including control data of said at least one primary alternative zone, said partitions, said secondary alternative zone and an unused area.

In a preferred embodiment of the apparatus of the invention, the volume control area is divided into a partition control area and an alternative zone control area, a partition control block holding control data necessary for the allocation of partitions and the recording and reproducing of a file is formed to be recorded in said partition control area, and an alternative zone control block having control data necessary for the recording and reproducing of data including the allocation of partitions and the substitution of defective sectors is formed to be recorded in said alternative zone control area.

In a preferred embodiment of the apparatus of the invention, a defect control mode for identifying the operation mode of the defect management is recorded as one part of partition control data and alternative zone control data, thereby enabling the operation mode of the substitution management to be set in units of a partition.

In a preferred embodiment of the apparatus of the invention, a volume control block for storing control data necessary for the operation of recording and reproducing data is generated to be recorded in said volume control area, said operation including the allocation of partitions, the recording and reproducing of a file, and the substitution of a defective sector.

In a preferred embodiment of the apparatus of the invention, a defect control mode for identifying the operation mode of the defect management is recorded as one part of volume control data, thereby enabling the operation mode of the substitution management to be set in units of a partition.

In a preferred embodiment of the apparatus of the invention, the substitution management is conducted while at least one partition is divided into a plurality of alternative zones, and a plurality of prime areas are arranged successively in said partition.

In a preferred embodiment of the apparatus of the invention, the substitution management is conducted while at least one partition is divided into a plurality of alternative zones, and a plurality of primary defect list areas are arranged successively in said partition.

In a preferred embodiment of the apparatus of the invention, the substitution management is conducted while at least one partition is divided into a plurality of alternative zones, and an operation of fetching a primary defect list of an alternative zone in a partition which zone contains a recording and reproducing area of data is followed by an operation of fetching a primary defect list of another alternative zone which is in said partition and follows said alternative zone.

In a preferred embodiment of the apparatus of the invention, address information of an alternative sector to be used next in said primary spare area or secondary spare area is recorded in a header of said primary defect list or secondary defect list.

In a preferred embodiment of the apparatus of the invention, the information recording medium is rewritable for a limited number of times, alternative sectors the number of which is greater than the maximum number of defective sectors registrable in said primary defect list or secondary defect list are allocated in said primary spare area or secondary spare area, and, when one of said alternative sectors is defective, the recording operation is executed using another one of said alternative sectors which has not been used.

In a preferred embodiment of the apparatus of the invention, the information recording medium cannot be rewritten, sectors, the number of which equals the number of defective sectors registrable in said primary defect list or secondary defect list, are allocated in said primary defect list area or secondary defect list area, the updation of said primary defect list or secondary defect list is executed employing successively unused sectors in said primary defect list area or secondary defect list area, the sequence of employing unused sectors beginning at one end of said primary defect list area or secondary defect list area, and using a primary defect list or secondary defect list fetched from a sector which is positioned immediately before said employed unused sector.

According to the invention, defective sectors are managed in the units of alternative zones which are formed in accordance with the volume capacity or partition capacity and the occurrence rate of defective sectors. Hence, control data for the substitution of defective sectors (i.e., the capacity of the primary defect list) can always be small in size and fixed in length, thereby enabling the capacity of a buffer for storing the primary defect list to be small, and also enabling the operation of retrieving the primary defect list to be rapidly conducted to reduce the time required for the operation. When a non-rewritable medium such as a write-once optical disk is used, the use of such a compact prime defect list can reduce the capacity of a prime defect list area for recording new prime defect lists. When a medium in which the number of rewriting information is limited is used, the use of such a compact prime defect list can reduce the number of rewriting the primary defect list. According to the invention, further, the substitution of defective sectors are conducted on the basis of the hierarchical data structure. Therefore, a medium in which many defective sectors may be locally generated can be easily handled. The present invention achieves the excellent defect management in an information recording medium in which the number of the rewriting operations is restricted or which is not rewritable.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
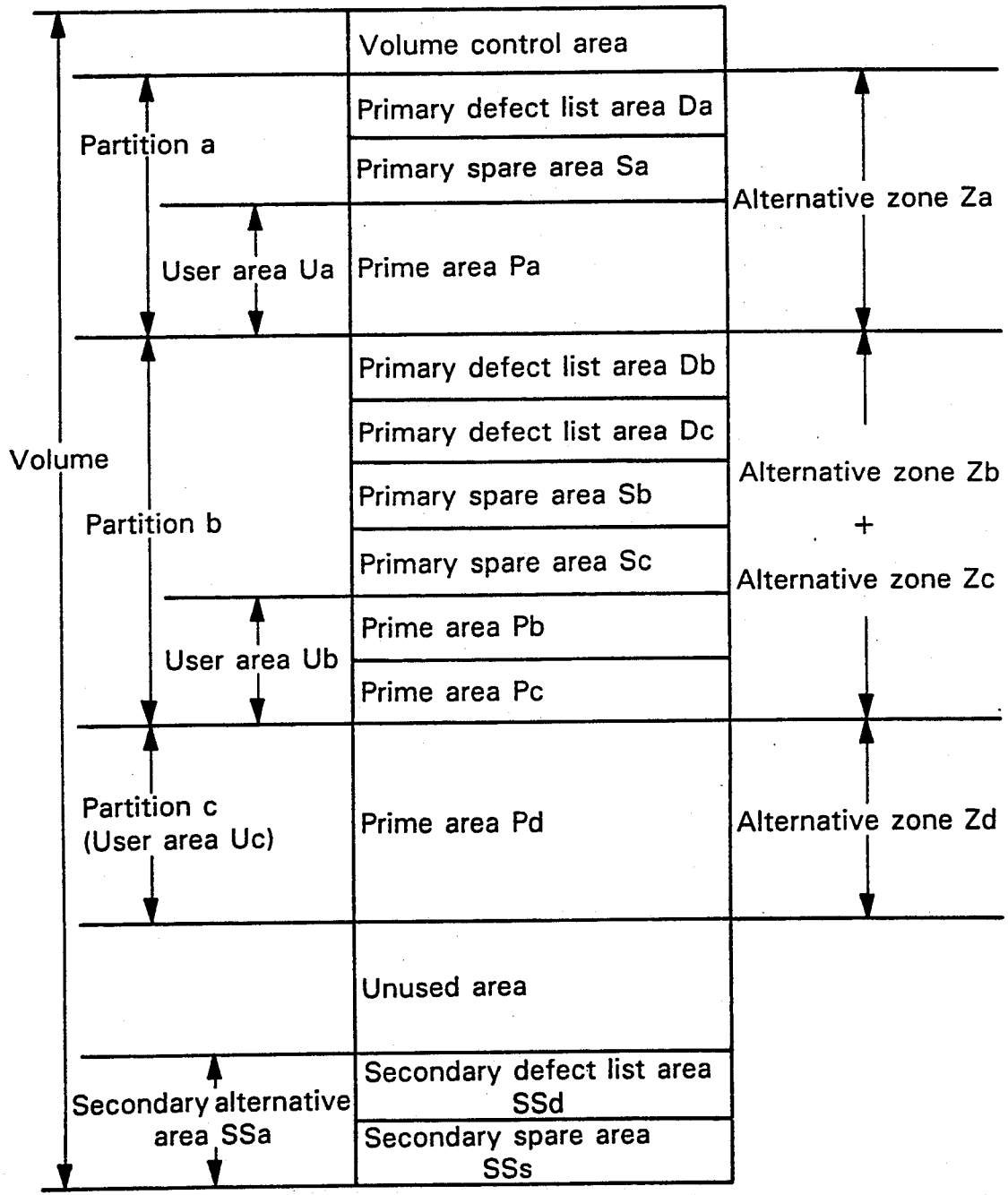
FIG. 1 is a diagram illustrating the area arrangement of an information recording medium used in one embodiment of the invention.

FIG. 1 illustrates diagrammatically the arrangement of a medium such as an optical disk used in one embodiment of the invention. In the medium of FIG. 1, a plurality of partitions are formed in one volume, and the file management is conducted in the unit of partition. When a medium such as an optical disk apparatus having a capacity of hundreds of MB is controlled by a general purpose OS such as the MS-DOS in which the maximum capacity of the logical drive is restricted, the entire volume is divided into several partitions, and each partition is regarded as one logical drive when performing the file management. In the following description, one partition is assigned to the entire volume except the case wherein the division of the volume into partitions is necessary.

According to the invention, the defect control can be performed in either of two operation modes, the automode, and the host mode. In the automode, an optical disk control unit automatically executes the process of substituting a defective sector with another one, according to the procedure incorporated in the unit. By contrast, in the host mode, the host computer executes the substituting process according to a specific procedure designated by the OS or application program. These operation modes can be set in the unit of partition. In a partition in which the automode is set, one or more primary alternative zones are formed as a unit for performing the substitution of a defective sector. The number of the alternative zones depends on the capacity of the partition or the occurrence rate of a defective sector. The alternative zone comprises: a prime area in which user data are recorded; a primary spare area in which alternative sectors are recorded; and a primary defect list area in which a primary defect list storing the relationship between defective sectors and alternative sectors is recorded. If one partition comprises two or more alternative zones, the prime areas of the alternative zones are successively allocated so that the user areas in which user data are recorded are formed continuously in one partition.

A specific example of the area allocation will be described with reference to FIG. 1. In this example, a primary defect list having a capacity corresponding to one sector (1 KB) can register a maximum of 120 defective sectors, and the rate of defective sectors is permitted to a maximum of 0.4%. The maximum capacity of a prime area of each alternative zone is given as follows.

$$120/(0.4\%) = 30,000 \text{ (sectors)}$$
$$= 30 \text{ MB}$$

When a partition a is designated to have a user area Ua of 20 MB, therefore, the partition a is composed of an alternative zone Za alone. In this case, the user area Ua equals a prime area Pa. A partition b designated to have a user area of 50 MB is composed of two alternative zones Zb and Zc which have a prime area Pb or Pc of 25 MB, respectively. As shown in FIG. 1, the prime area Pb of the alternative zone Zb and the prime area Pc of the alternative zone Zc are successively formed so that the prime areas Pb and Pc constitute a user area Ub.

The capacity of a primary defect list area varies depending on whether the medium is rewritable or not, but within the same medium it is identical in all alternative zones which is set to the automode. More specifically, in a medium which cannot be rewritten, a primary defect list area can be rewritten the number of times which equals the number of registered defective sectors, therefore, the number of sectors allocated in a primary defect list equals the maximum number (i.e., 120) of defective sectors the data of which can be registered in the primary defect list, resulting in that the capacity of the primary defect list area is 120 KB. In a medium which can be rewritten more than 120 times, a primary defect list is updated in a same area so that the capacity of the primary defect list area equals that of one sector (i.e., 1 KB).

The capacity of a primary spare area also varies depending on whether the medium is rewritable or not, but it is common in all alternative zones which are set to the automode. For example, in spite that the number of rewriting a medium is restricted to 100,000 times on an average, it is often that such a medium is requested to be rewritten more than 100,000 times. In such a case, defective sectors are substituted with alternative sectors in a primary spare area, and some of these alternative sectors may again become defective sectors as the number of rewriting increases, thereby necessitating further alternative sectors to be allocated in the primary spare area. Hence, the number of alternative sectors allocated in a primary spare area are increased, in proportion to the required rewriting number, to that greater than the maximum number of registered defective sectors. For example, if the required rewriting number is 1,000,000, alternative sectors the number of which is ten times the maximum number of registered defective sectors (that is, 1,200 sectors) are allocated in a primary spare area, resulting in that the capacity of the primary spare area is 1.2 MB. In contrast, in a medium which is not rewritable or not limited in the number of rewritings, alternative sectors in the same number as the maximum number of registered defective sectors are allocated in a primary spare area, and its capacity is 120 KB.

A partition c shown in FIG. 1 wherein the host mode is set is assigned with a alternative zone Zd having only a prime area Pd the capacity of which is the same as that of a user area Uc. Since this partition has no primary defect list area, the capacity of a prime area is not limited.

If defective sectors are detected in a greater number than a fixed value from a prime area or a primary spare area wherein the automode is set, it become impossible to conduct the process of substituting defective sectors with alternative sectors within the same alternative zone. This may be solved by forming a secondary alternative zone or area SSa which records the data of defective sectors which overflow the primary alternative zone. The secondary alternative zone or area SSa comprises a secondary spare area SSs for recording alternative sectors, and a secondary defect list area SSd for recording secondary defect list which store the relationship between defective sectors and alternative sectors. The capacity of each of these areas is determined according to the characteristics of the medium in the same manner as the primary defect list areas and primary spare areas.

A volume control area is formed at the beginning of the volume. The volume control,,, area manages the above-mentioned partitions, primary alternative zones and secondary alternative zone area, and as well as an unused area wherein any partition has not been allocated.

Figure 2:
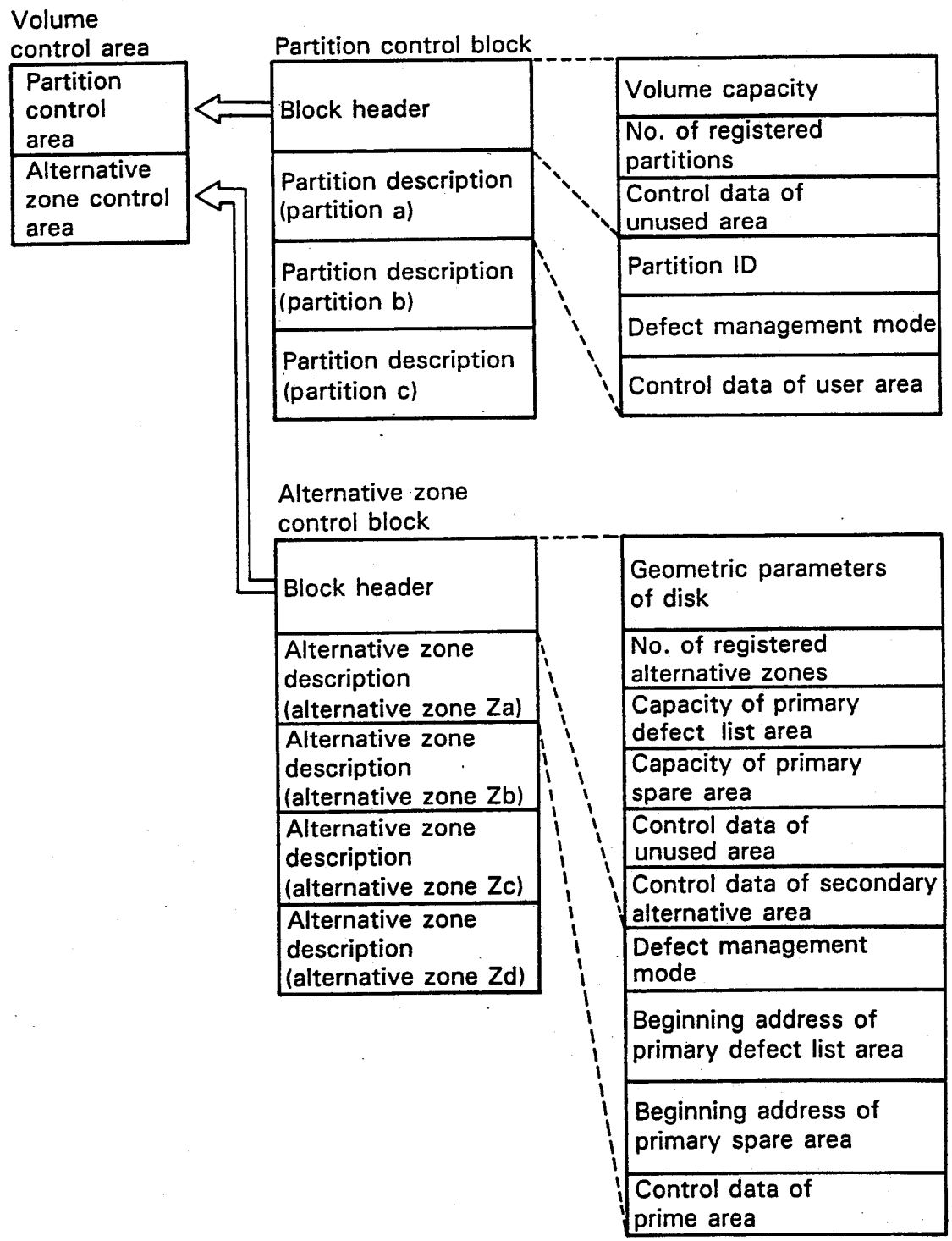
FIG. 2 is a diagram illustrating a volume control area in a first embodiment of the invention.

FIG. 2 shows a volume control area useful in an embodiment of the invention. The volume control area of FIG. 2 is composed of a partition control area and an alternative zone control area. In the partition control area, a partition control block holding data which are used in the file management by the host computer is recorded, whereas, in the alternative zone control area, an alternative control block holding data necessary for the defect management is recorded. At the beginning of the partition control block, control data regarding the volume such as the capacity of the volume, the number of the registered partitions, and data of the unused area (e.g., the beginning address and the capacity) are recorded as a block header. This block header is followed by a partition description holding the control information of each partition. Each partition description contains a partition ID of the corresponding partition, a defect management mode for distinguishing the operation mode of the defect management, and control information of the user area (e.g., the beginning address and the capacity), etc. When a partition is divided into plural alternative zones, such as in the partition b, the beginning address of the prime area Pb is registered as the beginning address of the user area.

At the beginning of the alternative zone control block, control data regarding the alternative zones such as geometrical parameters of disk including the number of tracks per volume and number of sectors per track, the number of registered alternative zones, the capacity of the primary defect list area and primary spare area, and control information of the unused area and secondary alternative area (e.g., the beginning address and the capacity) are recorded as a block header. This block header is followed by an alternative zone description holding the control information of each alternative zone. Each alternative zone description contains the beginning addresses of the primary defect lists and primary spare areas for constituting the corresponding alternative zones, the control information of the prime areas (e.g., the beginning address and the capacity), and a defect management mode for distinguishing the operation mode of the defect management. Since a primary defect list area and primary spare area are not assigned in the alternative zone set in the host mode, the beginning addresses of the primary defect list area and primary spare area in the alternative zone description are not actually given.

Figure 3:
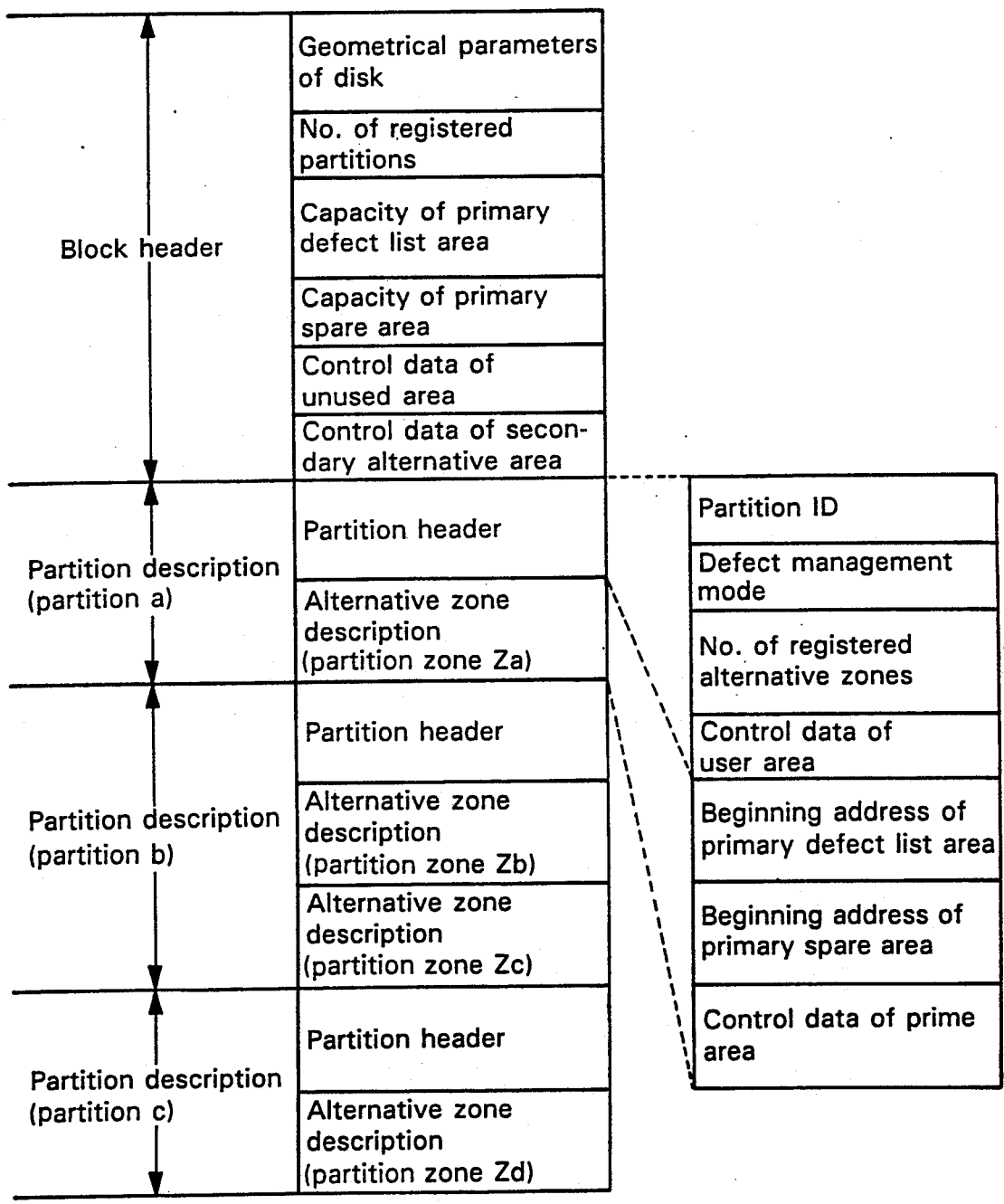
FIG. 3 is a diagram illustrating a volume control block in a second embodiment of the invention.

FIG. 3 shows another volume control area useful in an embodiment of the invention. The volume control area of FIG. 3 records a volume control block all control data regarding the volume. At the beginning of the volume control block, control data regarding the entire disk such as the geometrical parameters of the disk including the number of tracks per volume and the number of sectors per track, the number of registered partitions, the capacities of the primary defect list area and primary spare area, and control information of the unused area and secondary alternative area (e.g., the beginning address and the capacity) are recorded as a block header. This block header is followed by a partition description holding the control information of each partition. In each partition description, the partition ID of the corresponding partition, the defect management mode for distinguishing the operation mode of the defect management, the number of registered alternative zones, the control information of the user area (e.g., the beginning address and the capacity), and other control information of the entire partition are recorded as a partition header. This partition header is followed by the record of the alternative zone description holding the control information of each alternative zone constituting the partition. This alternative zone description contains the beginning addresses of the primary defect list areas and primary spare areas for constituting the corresponding alternative zones, and the control information of the prime areas (e.g., the beginning address and the capacity).

Figure 4:
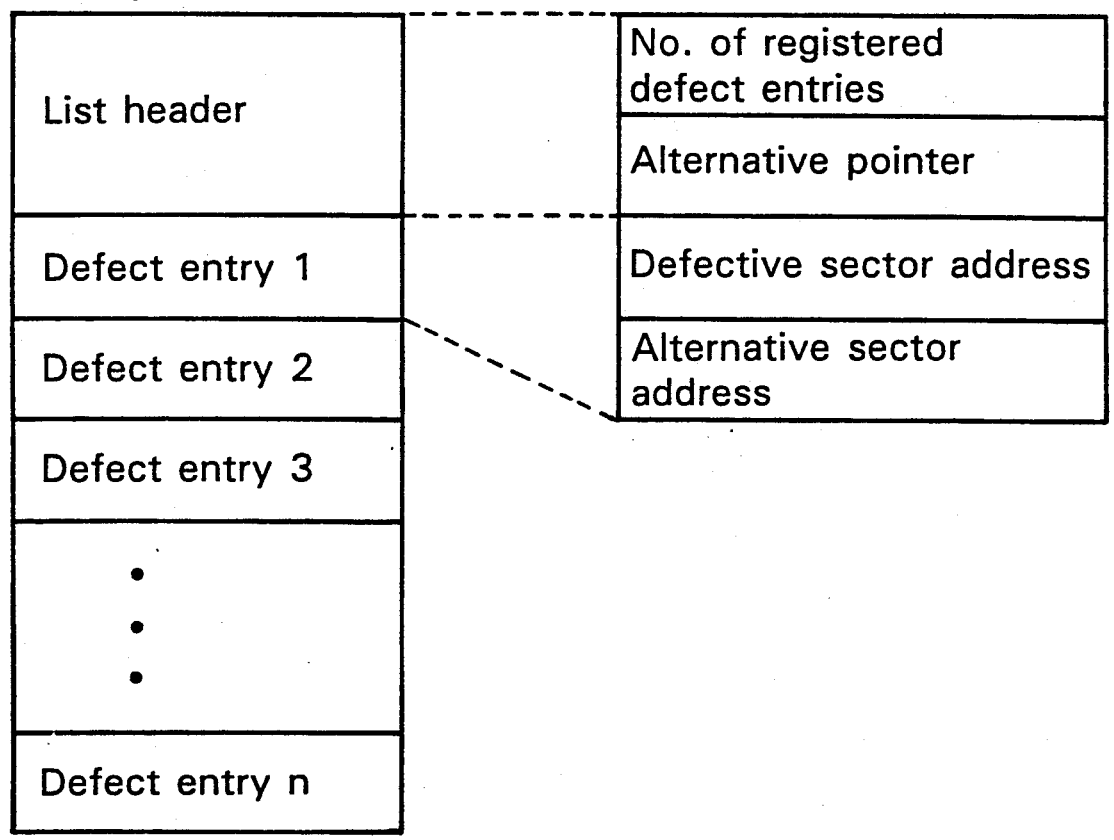
FIG. 4 is a diagram illustrating a primary defect list.

FIG. 4 illustrates a primary defect list. At the beginning of the primary defect list, the number of defective entries and an alternative pointer indicating the address of the alternative sector to be used next are recorded as a list header. This list header is followed by defect entries each of which contains the address of the corresponding defective sector and the address of the alternative sector for substituting is. The secondary defect list has the same data structure as the primary defect list described above.

Figure 5:
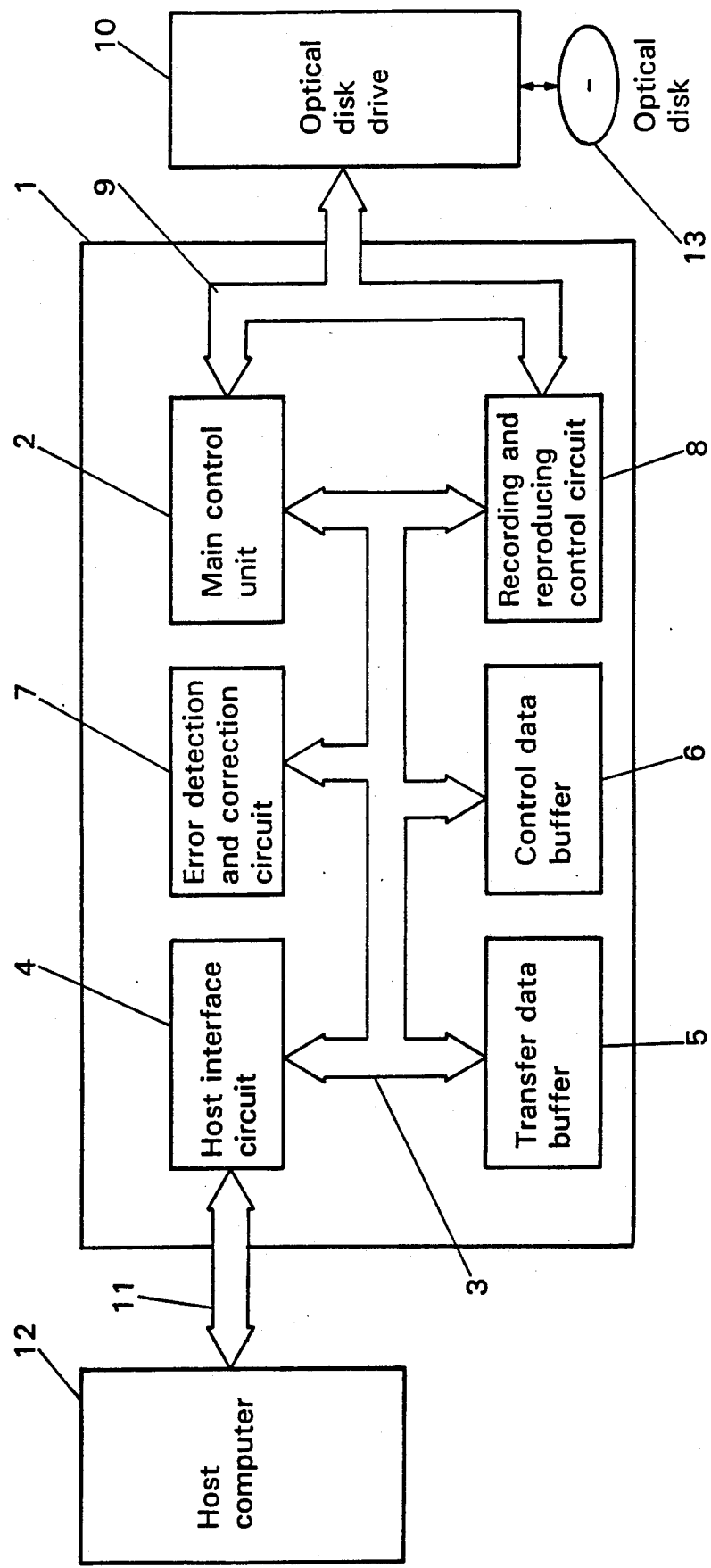
FIG. 5 is a block diagram of an optical disk control apparatus according to the invention.

FIG. 5 is a block diagram of an optical disk controller 1 used in an embodiment of the invention. The controller 1 comprises a main control unit 2 having a microprocessor for controlling the optical disk controller 1 according to the control sequence stored therein, a host interface circuit 4, a transfer data buffer 5, a control data buffer 6, an error detection and correction circuit 7, and a recording and reproducing control circuit 8. These components are interconnected by internal buses 3. The main control unit 2 exchanges drive commands and drive sense data with an optical disk drive 10 by way of a drive interface 9. The transfer data buffer 5 stores recorded/reproduced data to be transferred to and from a host computer 12. The control data buffer 6 contains the alternative zone control block, volume control block, primary defect list and secondary defect list which are used as the disk control information by the main control unit 2. The host interface circuit 4 is connected to the host computer 12 via a host interface 11 such as SCSI, and exchanges the control information such as device command and sense data with the main control unit 2, and also transfers recorded/reproduced data to the transfer data buffer 5 through the internal bus 3.

When recording data, the error detection and correction circuit 7 reads out data to be recorded from the transfer data buffer 5 or control data buffer 6 through the internal bus 3, and adds an error detection and correction code to the data. The recording and reproducing control circuit 8 reads out the data to which an error detection and correction code has been attached, from the transfer data buffer 5 or control data buffer 6, and transfers them through the drive interface 9 to the optical disk drive 10 in which an optical disk 13 has been mounted. When reproducing data, the recording and reproducing control circuit 8 demodulates reproduced data which have been transferred from the optical disk drive 10 through the drive interface 9, and then writes demodulated data into the transfer data buffer 5 or control data buffer 6. The error detection and correction circuit 7 reads demodulated data from these buffers, and detects and corrects errors in the data by using the error detection and correction code.

The operation of the optical disk controller 1 will be described by way of illustrating two examples. In a first example, as shown in FIG. 2, the partition control block to be used in the file management and the alternative zone control block to be used in the defect management are recorded in the volume control area. By contrast, in a second example, the volume control block holding all control data necessary for the volume control is recorded in the volume control area, as shown in FIG. 3. For the sake of simplicity of explanation, it is supposed that the volume control block, partition control block, the alternative zone control block, primary defect list and secondary defect list have a capacity corresponding to one sector. In the following, the operation for a rewritable optical disk will be described first, followed by a description for a write-once optical disk.

Figure 6:
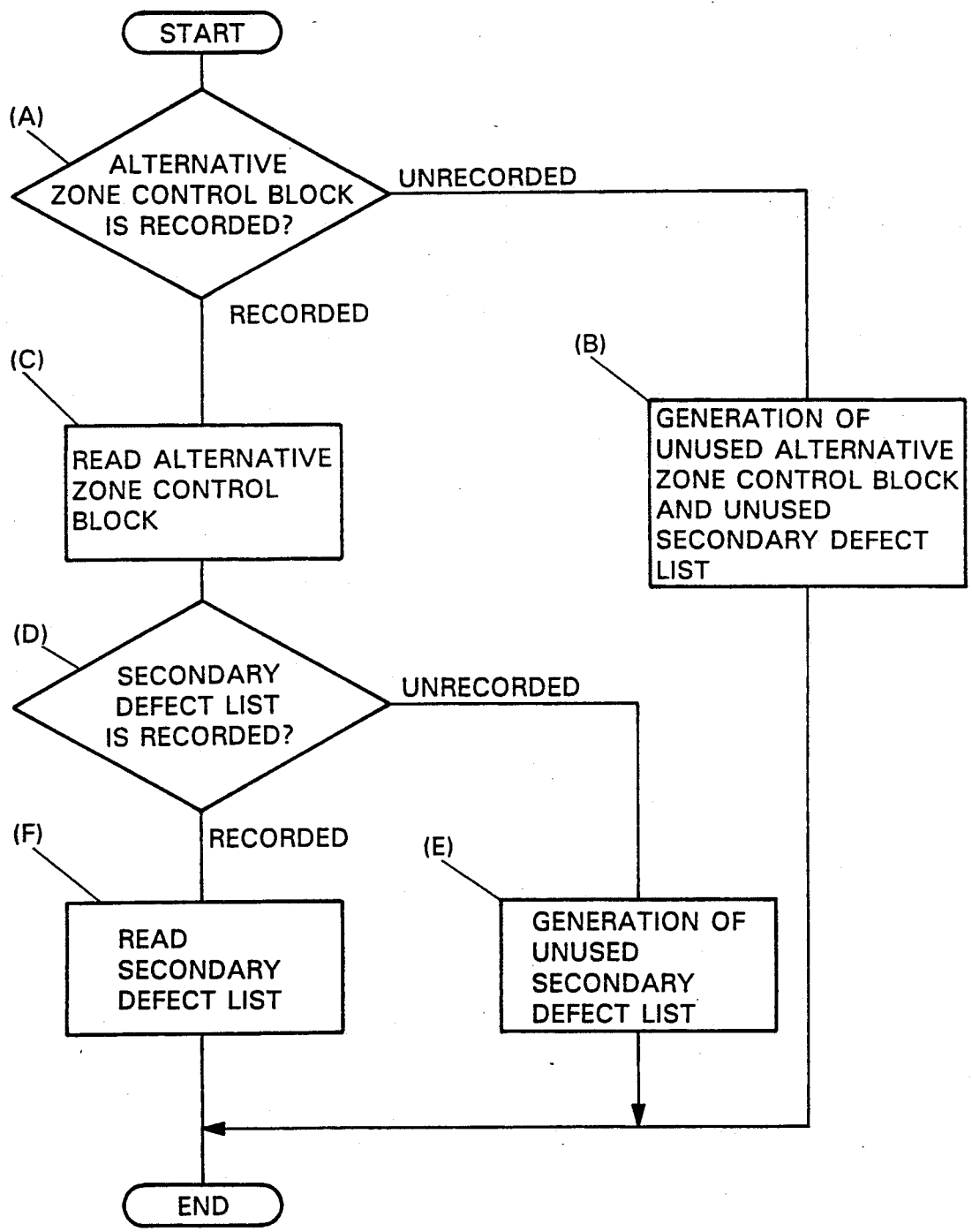
FIG. 6 is a flow chart of the operation of reading an alternative zone control block.

The first example is described below with respect to the operations of reading control data, registering partitions, and recording and reproducing a file accompanied by the substitution process of defective sectors. To begin with, the action of the optical disk controller 1 for reading out the alternative zone control block and secondary defect list into the control data buffer 6 at the time of loading the disk is explained with reference to the flow chart of FIG. 6.

(A) When the optical disk drive 10 detects that a new disk is loaded in the apparatus, it notices the loading of the disk to the main control unit 2 through the drive interface 9. The main control unit 2, receiving this information, sends out a drive command to the optical disk drive 10 through the drive interface 9 to seek the alternative zone control area. When the optical disk drive 10 notices the end of the seek operation to the main control unit 2 through the drive interface 9, the main control unit 2 specifies the address of the alternative zone control area as the target sector address to the recording and reproducing control circuit 8, and starts the data reproducing operation. The recording and reproducing control circuit 8 detects the target sector, and attempts to reproduce the data from the target sector.

(B) When the alternative zone control area has not yet been recorded, the main control unit 2 detects the nonrecord flag sent out from the recording and reproducing control circuit 8, and consequently produces in the control data buffer 6 an alternative zone control block having only a block header in which the number of registered alternative zones is zero, and a secondary defect list having only a list header in which the number of registered defect entries is zero are generated.

(C) On the other hand, when the alternative zone control area has been already recorded, the recording and reproducing control circuit 8 demodulates the data read out from the optical disk drive 10, and transfers them to the control data buffer 6. When the transfer of the reproduced data is completed, the main control unit 2 starts the error detection and correction circuit 7 to correct errors in the reproduced data, and the alternative zone control block which has been read out is stored in the control data buffer 6.

(D) When the alternative zone control block is read out, the main control unit 2 reads out the control data in the secondary alternative area recorded in the alternative zone control block. The main control unit 2, in the same procedure as in (A), seeks the secondary defect list area, and attempts to reproduce the secondary defect list.

(E) If the secondary defect list area has not yet been recorded, a nonrecord flag sent out from the recording and reproducing control circuit 8 is detected, and consequently the main control unit 2 generates in the control data buffer 6 a secondary defect list having only a list header in which the number of defect entries registered in the secondary defect list is zero.

(F) On the other hand, when the secondary defect list area has been already recorded, the recording and reproducing control circuit 8 demodulates the data read out from the optical disk drive 10, and transfers them to the control data buffer 6. When the transfer of the reproduced data is over, the main control unit 2 starts the error detection and correction circuit 7 to correct errors in the reproduced data, and the secondary defect list is stored in the control data buffer 6.

As a result of the above-described operation, the alternative zone control block and secondary defect list which have been read out from the optical disk are stored in the control data buffer 6. If the alternative zone control area or the secondary defect list area is in the unrecorded state, the alternative zone control block or secondary defect list meaning the unused state is generated in the control data buffer 6.

Figure 7:
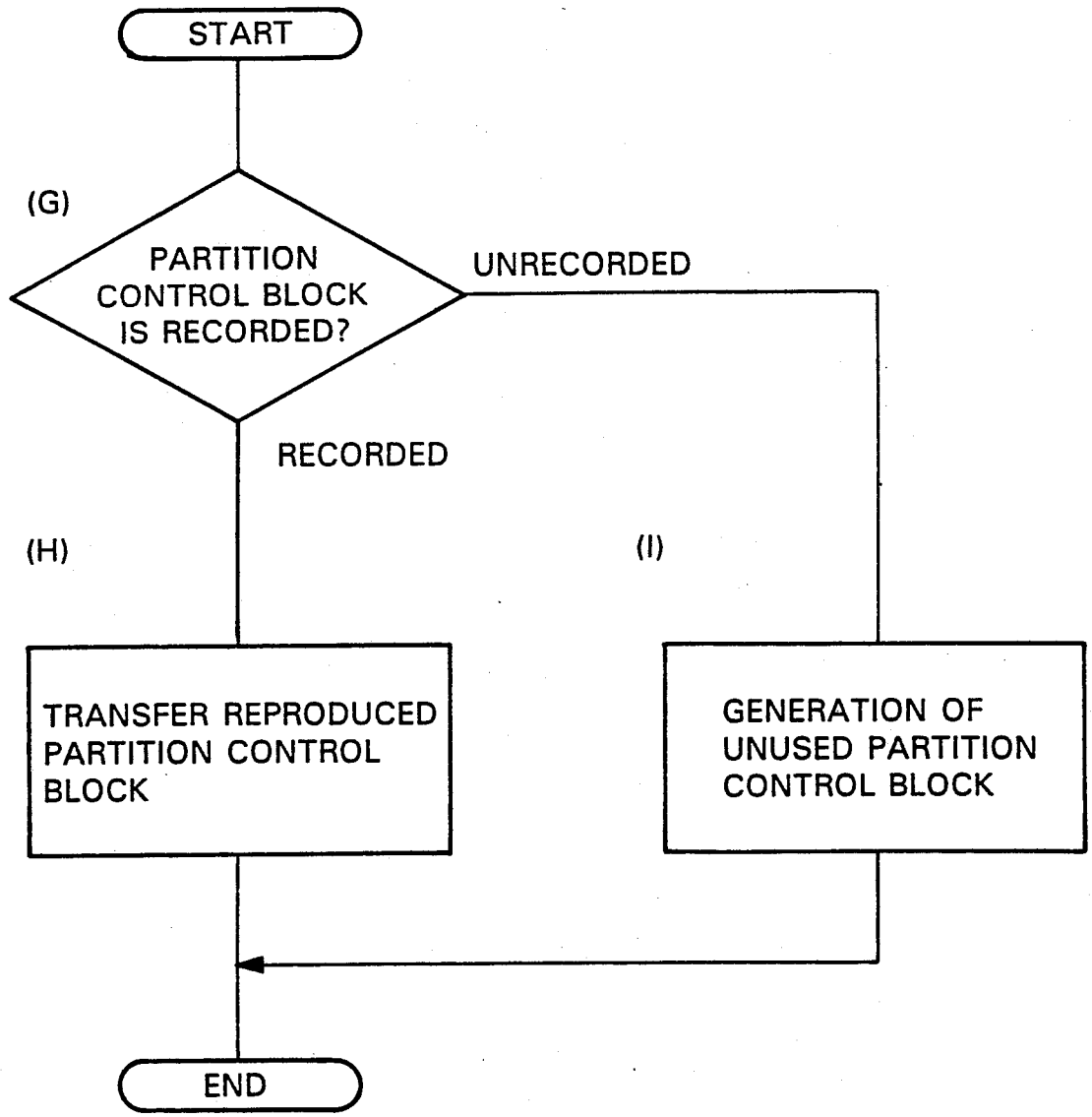
FIG. 7 is a flow chart of the operation of reading a partition control block.

Then, the operation of the host computer for reading out the partition control block which is executed prior to the operation of recording partitions or recording and reproducing a file will be described with reference to the flow chart of FIG. 7.

(G) The host computer 12 sends out a device command (READ Command) specifying the partition control area as the data reproducing area. The main control unit 2 reads out and interprets the device command taken into the host interface circuit 4, and then seeks the partition control area in the same procedure as in (A), and attempts to reproduce the partition control block.

(H) When the partition control area has been already recorded, the recording and reproducing control circuit 8 demodulates the data read out from the optical disk drive 10, and transfers them to the transfer data buffer 5. The main control unit 2 starts the error detection and correction circuit 7 to correct errors in the reproduced data. Then, the main control unit 2 starts the host interface circuit 4 to transfer the reproduced data from the transfer data buffer 5 to the host computer 12. The reproduced data is stored in the host computer 12 as the partition control block.

(I) On the other hand, if the partition control area has not yet been recorded, the main control unit 2 detects a nonrecord flag sent out from the recording and reproducing control circuit 8, and generates sense data meaning that the target sector is in the unrecorded state, and informs it to the host computer 12 through the host interface circuit 4. The host computer 12, in turn, detects the unrecorded state of the partition control area, and generates a volume control block having only a block header. In this block header, the number of registered partitions is given as zero, and the control data of the unused area meaning that the entire volume is in the unused state is registered.

In this processing sequence, the host computer preserves the partition control block therein.

Figure 8:
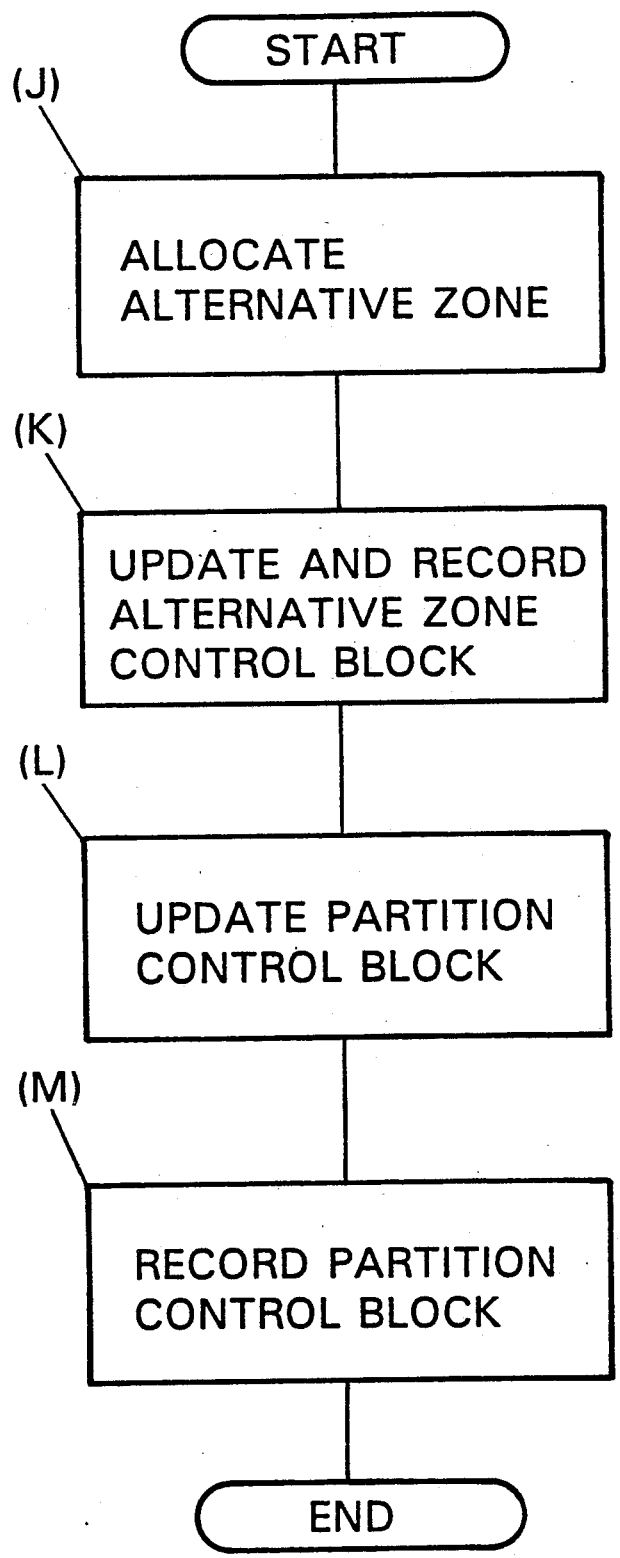
FIG. 8 is a flow chart of the operation of registering a partition.

Next, the operation of the host computer 12 for registering a new partition is described below with reference to the flow chart of FIG. 8.

(J) The host computer 12 generates the beginning address of the unused area read out from the block header of the partition control block held in the computer, the capacity of the partition to be registered, and the device command (ASSIGN PARTITION Command) which contains the operation mode of the defect management of the defective sector, and sends out the device command to the host interface circuit 4. The main control unit 2 reads out and interprets the device command from the host interface circuit 4, and interprets it to assign certain alternative zones from the beginning of the unused area, depending on the operation mode of the defect management specified by the device command and the capacity of the partition. The main control unit 2 then generates the alternative zone description holding the control data of the newly assigned alternative zone, and updates the alternative zone control block held in the control data buffer 6.

(K) Thereafter, the main control unit 2 sends out a drive command to the optical disk drive 10, and executes the seek operation again in the alternative zone control area. When the seek operation is over, the main control unit 2 starts the error detection and correction circuit 7 to attach an error detection and correction code to the alternative zone control block in the control data buffer 6 which is the data to be recorded. Further, the main control unit 2 designates the address in the alternative zone control area as the target sector address to the recording and reproducing control circuit 8, and starts the data recording operation, thereby recording the recorded data in the alternative zone control area.

(L) The main control unit 2 generates the sense data holding the beginning address of the user area in the newly formed partition and the control data of the unused area after the registration of the partition, and transfers it to the host computer 12 by way of the host interface circuit 4. The host computer 12 rewrites the block header of the partition control block relating to the number of registered partitions and the control data of the unused area, according to the transferred sense data, and additionally registers the partition description in which the control data of a new partition is held, thereby updating the partition control block.

(M) In order to record the updated partition control block, the host computer 12 sends out a device command (WRITE Command) specifying the partition control area as the data recording area. The main control unit 2 reads out the device command from the host interface circuit 4, and interprets it to send out the drive command to the optical disk drive 10, thereby executing the seek operation against the partition control area. When the seek action is over, the main control unit 2 starts the host interface circuit 4 to transfer the partition control block from the host computer 12 to the transfer data buffer 5. Then, the main control unit 2 starts the error detection and correction circuit 7 to add an error detection and correction code to the recorded data in the transfer data buffer 5. Further, the main control unit 2 specifies an address of the partition control area as the target sector address to the recording and reproducing control circuit 8, and executes the data recording operation, thereby recording the partition control block in the partition control area.

By this processing sequence for registering partitions, a new alternative zone is assigned in the unused area in the disk, and the updated partition control block and alternative zone control block area are recorded.

Figure 9:
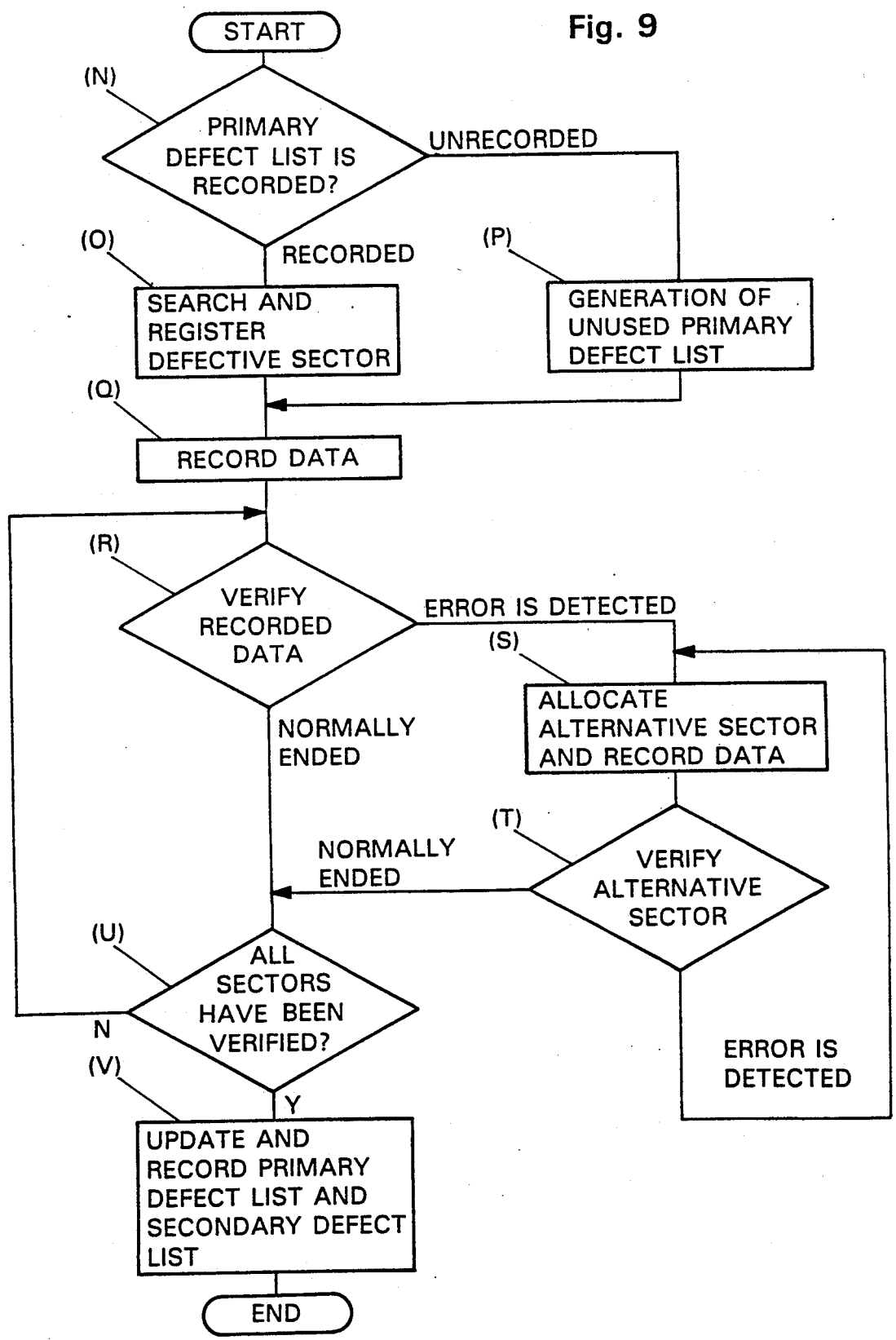
FIG. 9 is a flow chart of the operation of recording a file.

Referring now to the flow chart of FIG. 9, the operation of recording data in a file accompanied by the detection of a defective sector and the substitution thereof in a partition wherein the operation mode of the defect management is set to the automode.

(N) The host computer 12 sends out the device command (WRITE Command) in which the file recording area is specified. The main control unit 2 reads out the device command from the host interface circuit 4, identifies the alternative zone containing the recording area of the file by referring to the alternative zone control block held in the control data buffer 6, and reads out the alternative zone description holding the control data of the alternative zone. Next, in the same procedure as in (A), the main control unit 2 executes the seek action against the primary defect list area in this alternative zone, and attempts to reproduce the primary defect list.

(O) When the primary defect list area has been already recorded, the recording and reproducing control circuit 8 demodulates the data read out from the optical disk drive 10, and transfers them to the control data buffer 6. The main control unit 2 starts the error detection and correction circuit 7 to correct errors in the reproduced data. Thereafter, the main control unit 2 searches the primary defect list fetched to the control data buffer 6 for defective sectors contained in the file recording area. If the number of the defect entries recorded in the primary defect list reaches the maximum number of defect entries that can be registered in the list, the main control unit 2 searches also the second defect list stored in the control data buffer 6 for defective sectors contained in the file recording area. If defective sectors are found, the main control unit 2 reads out the defect entries which control such defective sectors, and holds them inside it.

(P) When the primary defect list area has not yet been recorded, the main control unit 2 detects a nonrecord flag sent out from the recording and reproducing control circuit 8, and then it is judged that the primary defect list is in the unrecorded state. The primary defect list having only the list header is generated in the control data buffer 6. In this list header, the number of registered defect entries is given as zero, and the address of the first sector in the primary spare area is given as an alternative pointer.

(Q) The main control unit 2 sends out a drive command to the optical disk drive 10, and seeks the target sector which is the sector assigned as a file recording area. When the assigned sector is judged in the procedure of (O) to be a defective sector, the main control unit 2 sends out a drive command specifying an alternative sector replacing the defective sector as the target sector, and executes the seek operation against the primary spare area or secondary spare area. When the seek operation is over, the main control unit 2 starts the host interface circuit 4 to transfer the data to be recorded from the host computer 12 to the transfer data buffer 5. The main control unit 2 starts the error detection and control circuit 7 to add an error detection and correction code to the recorded data. Moreover, the main control unit 2 specifies the target sector address to the recording and reproducing control circuit 8, and starts the data recording action, thereby recording data in the target sector. These data recording operations are executed on all sectors assigned as a file recording area.

(R) The main control unit 2 sends out again a drive command to the optical disk drive 10, and executes the operation of seeking the target sector which is the sector assigned as a file recording area. At this time, when the assigned sector is judged in the procedure of (O) to be a defective sector, the main control unit 2 sends out a drive command specifying an alternative sector replacing the defective sector as the target sector, and the seek operation is executed in the primary spare area or secondary spare area. When the seek operation is over, the main control unit 2 specifies the target sector address to the recording and reproducing control circuit 8, and starts the data reproducing operation. The recording and reproducing control circuit 8 demodulates the reproduced data transferred from the optical disk drive 10, and sends them out to the transfer data buffer 5. Then, the main control unit 2 starts the error detection and correction circuit 7, and attempts to detect errors contained in the reproduced data. If the degree of an error detected by the error detection and correction circuit 7 is smaller than the specified reference value (in other words, if the error can be corrected by the error detection and correction circuit 7), the main control unit 2 judges that the verify operation against the target sector has been normally terminated (i.e., without detecting any error). On the other hand, when an error exceeding the reference value is detected in the target sector, the main control unit 2 judges that the target sector is a defective sector, and holds the address of the defective sector.

(S) When a defective sector is detected, the main control unit 2 refers to the list header of the primary defect list stored in the control data buffer 6, and sequentially assigns to the detected defective sectors unused alternative sectors sequentially from one end of the primary spare area. Then, the main control unit 2 registers new defect entries into the primary defect list in the control data buffer 6, and updates the list header. If no unused entry exists in the primary detect list or no unused sector in the primary spare area, the substitution operation is disabled. In such a case, unused alternative sectors are sequentially assigned to those defective sectors from one end of the secondary spare area to such defective sector. The main control unit 2 then registers new defect entries in the secondary defect list stored in the control data buffer 6 and updates the list header.

(T) The main control unit 2 sends out a drive command to the optical disk drive 10 to seek the assigned alternative sector. When the seek operation is over, the main control unit 2 starts the error detection and correction circuit 7 to add an error detection and correction code to the recorded data which have been stored in the transfer data buffer 5 in the procedure of (Q), and thereafter specifies an alternative sector address as a target sector address to the recording and reproducing control circuit 8, and executes the data recording operation. When the data recording operation is over, the main control unit 2 executes the verify operation against the alternative sector in the same way as the procedure of (R).

(U) When the verify operation on the target sector is normally terminated in the procedure (R), or when the substitution operation on the defective sector in which a verify error has been detected is finished in the procedure of (S) and (T), the main control unit 2 executes the above-mentioned process on all sectors assigned as the file recording area.

(V) When the verify operation on all sectors and the substitution operation on the detected defective sectors are over, the main control unit 2 checks if the primary defect list and secondary defect list have been updated or not in the control data buffer 6. When the primary defect list has been updated, the main control unit 2 sends out a drive command to the optical disk drive 10 to seek the primary defect list area. When the seek operation is over, the main control unit 2 starts the error detection and correction circuit 7, and adds the error detection and correction code to the primary defect list in the control data buffer 6. Specifying the address in the primary defect list area as the target sector address to the recording and reproducing control circuit 8 to start the data recording operation, the data are recorded in the primary defect list area. When the secondary defect list is updated, the secondary defect list in the secondary defect list area is updated and recorded in the same procedure as mentioned above.

In the afore-mentioned processing sequence, the recording operation of file is executed in the partition in which the operation mode of the defect management is set to the automode. The dependence of the allocation procedure of alternative sectors in procedure (S) on the area of detecting defective sectors will be supplementarily described. First, a defective sector detected from the prime area and that detected from the primary spare area have a different criterion for judging whether the defective sector can be replaced within the alternative zone or not. In other words, if a defective sector has been detected from the prime area, in order to replace this defective sector within the alternative zone, it is necessary that an unused alternative sector be present in the primary spare area, and that an unused entry be present in the primary defect list. On the other hand, if a defective sector has been detected from the primary spare area, this defective sector can be replaced within the alternative zone as far as an unused alternative sector is present in the primary spare area, because this alternative sector already has a defect entry in the primary defect list. According to this criterion, when a detected defective sector is judged to be unable to be replaced within the alternative zone, an alternative sector in the secondary spare area which sector is in the unused state is used. The second point is the processing sequence relating to the updation and record of the control data of a defective sector. When an alternative sector within a secondary spare area is assigned to a defective sector detected in the primary spare area, the main control unit 2 registers a new defect entry in the secondary defect list, and deletes the unnecessary defect entry from the primary defect list. On the other hand, when a defective sector is detected in the prime area, only the operation of registering a new defect entry in the secondary defect list is executed.

The recording operation of file in the partition in which the operation mode of the defect management is set to the host mode is executed as follows. The main control unit 2 reads out a device command (WRITE Command) sent from the host computer 12 from the host interface circuit 4, and sends out a drive command to the optical disk drive 10 to seek the target sector in which the data is to be recorded. When the end of the seek operation is noticed from the optical disk drive 10, the main control unit 2 starts the host interface circuit 4, and transfers the data to be recorded from the host computer 12 into the transfer data buffer 5. Then, the main control unit 2 starts the error detection and correction circuit 7 to add an error detection and correction code to the recorded data, and further starts the recording and reproducing control circuit 8, thereby executing the data recording operation against the target sector assigned in the file recording area. When such a data recording operation has been conducted on all sectors assigned as a file recording area, the main control unit 2 executes the verify operation to all sectors in which data have been recorded. That is, the main control unit 2 starts the recording and reproducing control circuit 8 to demodulate the reproduced data transferred from the optical disk drive 10, and sends them to the transfer data buffer 5. Then, the main control unit 2 starts the error detection and correction circuit 7, thereby attempting to detect errors contained in the reproduced data. When the error detection and correction circuit 7 detects from the target sector an error the degree of which exceeds the reference value, the main control unit 2 generates sense data meaning that this target sector is a defective sector, and notices it to the host computer 12 through the host interface circuit 4, thereby finishing the execution of the device command. At this time, the host computer 12 executes the process of substituting defective sectors according to the procedure specified by the OS or application program.

Figure 10:
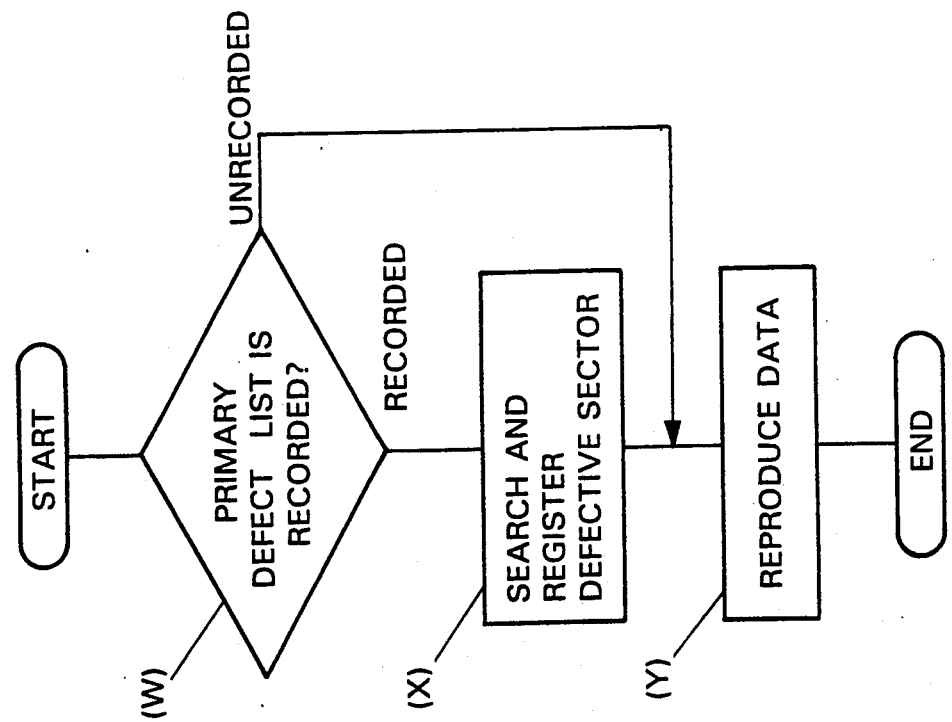
FIG. 10 is a flow chart of the operation of reproducing a file.

In the partition where the automode is set as the operation mode of the defect management, the file reproduction operation accompanied by the operation of reproducing data from the alternative sector is explained below by referring to the flow chart of FIG. 10.

(W) The host computer 12 sends out a device command (READ Command) specifying the file reproducing area. The main control unit 2 reads out the device command from the host interface circuit 4, and identifies the alternative zone containing the file reproducing area by referring to the alternative zone control block stored in the control data buffer 6, and reads out the alternative zone description holding its control data. Next, in the same procedure as in (A), the main control unit 2 executes the seek operation against the primary defect list area of the alternative zone, and attempts to reproduce the primary defect list. When a nonrecord flag meaning that the target sector is unrecorded is sent out from the recording and reproducing control circuit 8, the main control unit 2 detects that the primary defect list is in the unrecorded state, and judges that the defective sector is not present in the alternative zone containing the file reproducing area.

(X) When the primary defect list area has been already recorded, the recording and reproducing control circuit 8 demodulates the data read out from the optical disk drive 10, and transfers them to the control data buffer 6. The main control unit 2, starts the error detection and correction circuit 7, and corrects the errors in the reproduced data. The main control unit 2 searches the primary defect list read out into the control data buffer 6 for defective sectors contained in the file recording area. If the number of the registered defective entries reaches the maximum number of defect entries that can be registered in the primary defect list, the main control unit 2 searches the secondary defect list stored in the control data buffer 6 for defective sectors contained in the file recording area also. When a defective sector is detected, the main control unit 2 reads out the defect entry controlling the defective sectors and store it therein.

(Y) The main control unit 2 sends out a drive command to the optical disk drive 10, and executes the seek operation against the target sector which is a sector assigned as a file reproducing area. When the assigned sector is judged to be a defective sector in the procedure of (X), the main control unit 2 sends a drive command for designating the alternative sector instead of the defective sector as the target sector, and seeks the primary spare area or secondary spare area. When the seek operation is over, the main control unit 2 specifies the target sector address to the recording and reproducing control circuit 8, and starts the data reproducing operation. Next, the recording and reproducing control circuit 8 demodulates the data transferred from the optical disk drive 10, and sends them to the transfer data buffer 5. The main control unit 2 starts the error detection and correction circuit 7 to correct errors in the reproduced data. Thereafter, the main control unit 2 starts the host interface circuit 4, and transfers the reproduced data from the transfer data buffer 5. The data reproducing operation is executed on all sectors assigned as a file reproducing area.

According to this procedure, the file reading-out operation is executed from the partition where the automode is set as the operation mode of the defect management. On the other hand, in the partition where the host mode is set as the operation mode of the defect management, there is no possibility of accessing the alternative area. Therefore, the sectors assigned as a file reproducing area are subjected to only the same data reproduction operation as in procedure (Y).

The operation of searching the primary defect list during the file recording operation and reproducing operation in the partition where the defect management is set to the automode is supplementarily described below. In the operating procedure described with reference to FIGS. 9 and 10, the operation of searching the primary defect list is always conducted prior to the data recording operation or reproducing operation. However, once the file recording operation or file reproducing operation is executed, the primary defect list is stored in the control data buffer 6. When the file recording operation or file reproducing operation is executed again in the same alternative zone, therefore, the operation of searching the primary defect list is not required. In other words, the main control unit 2 interprets the device command, and judges whether the primary defect list of the alternative zone containing the recording area or reproducing area of the file is stored in the control data buffer 6 or not. When the primary defect list is found in the control data buffer 6, steps (N) and (P) in FIG. 9 or step (W) in FIG. 10 may be skipped. Second, in the operating procedure described by referring to FIGS. 9 and 10, the file recording area and reproducing area are supposed to be present in a single alternative zone. Actually, however, if the partition is divided into plural alternative zones as shown in the partition b in FIG. 1, the file recording area or reproducing area may spread over plural alternative zones. In such a case, all the related primary defect lists must be searched and read out. Third, in an apparatus for recording a file of a large capacity such as that for image data, it is often that data are divided so as to be stored in several files in view of the characteristics of a host computer. In such a case, it is predicted that the file recording areas and reproducing areas be continuous within a partition. Therefore, in both an alternative zone containing the file recording area and reproducing area and another alternative zone positioned ahead of that alternative zone, the process for reading out the primary defect list is executed continuously, resulting in that the number of executions of the seek operation between the primary defect list area and the prime area can be reduced, and the access time may be shortened. In such a case, it is preferable to dispose successively all primary defect list areas contained in a same partition.

The second example will be described. In the second example, the volume control block for holding all control information necessary for volume control is recorded in the volume control area as shown in FIG. 3. The second example, as compared with the first example, differs in the operation of reading the volume control block and also in the operation of registering a new partition. The operation of reading the volume control block when loading the disk can be explained by replacing the alternative zone control block with the volume control block, and by replacing the alternative zone control area with the volume control area in the process shown in FIG. 6. In sum, the main control unit 2 searches the volume control area to read out the volume control block, and stores them in the control data buffer 6. According to the control data of the secondary alternative area which are recorded in the volume control block, the main control unit 2 fetches the secondary defect list and stores it in the control data buffer 6. On the other hand, when the volume control area or secondary defect list area is in the unrecorded state, the main control unit 2 generates in the control data buffer 6 a volume control block having only a volume header or a secondary defect list having only a list header. Next, in the state that the volume control block is stored in the control data buffer, the host computer 12 sends out a device command (MODE SENSE Command) for obtaining the control data of the partition formed on the disk. The main control unit 2 interprets the device command taken in the host interface circuit 4, and, as shown in FIG. 2, generates a partition control block from the volume control block stored in the control data buffer 6, and sends it out to the host computer 12 as the mode sense data. As a result, the volume control block and secondary defect list are accepted into the control data buffer 6, and the host computer 12 stores the partition control block.

The operation of registering a partition is executed as follows. The host computer 12 generates and sends out a device command (ASSIGN PARTITION Command) carrying the beginning address of the unused area read out from the header of the partition control block stored inside, the capacity of the partition to be registered, and the operation mode of the defect management. The main control unit 2 reads out and interprets the device command taken into the host interface circuit 4, and assigns certain alternative zones from the beginning of the unused area, depending on the operation mode of the defect management specified by the device command and the capacity of the partition. The main control unit 2 then generates a partition description holding the control data of the partition newly assigned, and updates the volume control block in the control data buffer 6. The main control unit 2 starts the error detection and correction circuit 7 and the recording and reproducing control circuit 8, and records the updated volume control block in the volume control area, and finishes the execution of the device command. Finally, the host computer 12 sends out a device command (MODE SENSE Command) in order to confirm the registered partition, and the main control unit 2 generates again the partition control block, as shown in FIG. 2, from the volume control block stored in the control data buffer 6, and sends it out to the host computer 12 as the mode sense data. The host computer 12 updates the partition control block stored therein on the basis of the contents of the received mode sense data, and terminates the operation of registering a partition.

Figure 11:
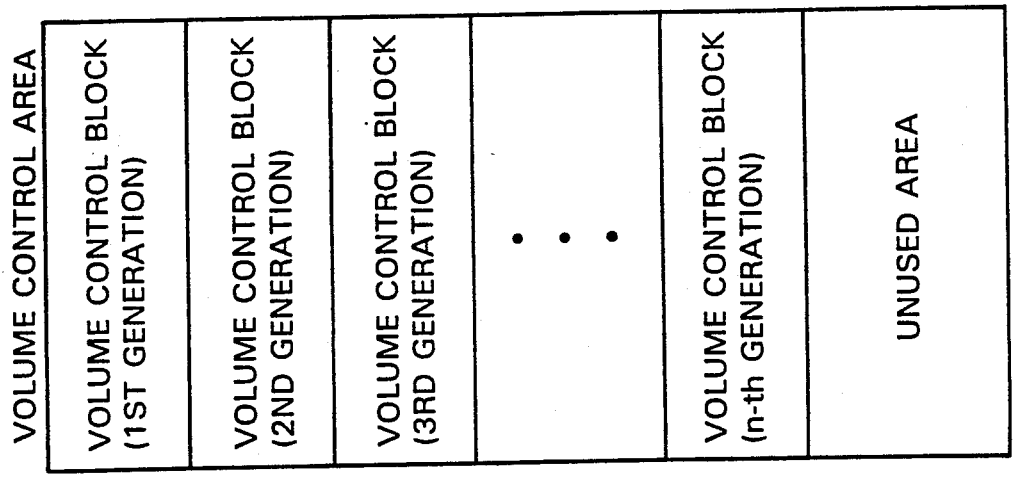
FIG. 11 is a diagram illustrating the recording area of control data in a write-once optical disk.

The above-mentioned description relates to a rewritable optical disk, and the control data of the volume control block, partition control block, alternative zone control block, primary defect list and secondary defect list are all supposed to be updated and recorded in the same area. However, in an information recording medium that is not rewritable such as a write-once optical disk, data cannot be updated or recorded within the same area. Hereinafter, the structure of the control data in a write-once optical disk and the recording and reproducing procedure therefor will be described by taking the volume control block as an example. FIG. 11 illustrates a volume control area formed in a write-once optical disk. As shown in FIG. 11, many areas for recording volume control blocks are assigned in the volume control area. In the operation of recording a new partition, the volume control block is updated and recorded by using unused sectors consecutively from one end of the volume control area. Therefore, many volume control blocks over generations are recorded in the volume control area, and the latest one among them is that recorded immediately before the unused area. In the operation of reading the volume control block when an optical disk is loaded, the data reproduction operation is executed consecutively from the sector positioned at one end of the volume control area, and the one which is reproduced last and positioned immediately before the unused sectors is regarded as the latest volume control block, and is stored in the control data buffer 6. The same data structure and recording and reproducing procedure are applied to the partition control block, alternative zone control block, primary defect list, secondary defect list and other control data.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method of managing defective sectors in a disk-shaped information recording medium in which the recording and reproducing of information are conducted in units of a sector, each sector being divided into one or more partitions, the file management being conducted in units of partition, comprising the steps of:

allocating at least one primary alternative zone in said information recording medium, said alternative zone comprising: a prime area for recording user data, said prime area having a variable capacity which corresponds to the occurrence rate of defective sectors and to a user capacity allocated to a partition; a primary spare area for recording alternative sectors which substitute for defective sectors; and a primary defect list area for recording a primary defect list of a fixed length, said primary defect list holding the relationship between defective sectors and alternative sectors, managing defective sectors in units of an alternative zone by substituting the defective sectors detected in said prime area with alternative sectors in said primary spare area, and by registering the defective sectors in said primary defect list, allocating a secondary alternative zone in said information recording medium, said secondary alternative zone comprising: a secondary spare area for recording alternative sectors for substituting for defective sectors which overflow from said at least one primary alternative zone; and a secondary defect list area for recording a secondary defect list which holds the relationship between defective sectors and alternative sectors in said secondary spare area, managing hierarchically defective sectors by substituting defective sectors which overflow from said at least one primary alternative zone, with alternative sectors in said secondary alternative zone, and by registering the defective sectors in said secondary defect list, and managing all area formed in the volume of said information recording medium by allocating a volume control area in said information recording medium, and by recording volume control data in said volume control area, said volume control data including control data of said at least one primary alternative zone. said partitions, said secondary alternative zone and an unused area.

2. A method according to claim 1, wherein said volume control area is divided into a partition control area including a partition control block for holding data necessary for the allocation of partitions and the recording and reproducing of a file and (b) an alternative zone control area including an alternative zone control block having control data necessary for the recording and reproducing of data including the allocation of partitions and the substitution of defective sectors.

3. A method according to claim 2, wherein a defect control mode for identifying the operation mode of the defect management is recorded as one part of partition control data and alternative zone control data, thereby enabling the operation mode of the substitution management to be set in units of a partition.

4. A method according to claim 1, wherein a volume control block for storing control data necessary for the operation of recording and reproducing data is generated to be recorded in said volume control area, said operation including the allocation of partitions, the recording and reproducing of a file, and the substitution of a defective sector.

5. A method according to claim 4, wherein a defect control mode for identifying the operation mode of the defect management is recorded as one part of volume control data, thereby enabling the operation mode of the substitution management to be set in units of a partition.

6. A method according to claim 1, wherein the substitution management is conducted while at least one partition is divided into a plurality of alternative zones, and a plurality of prime areas are arranged successively in said partition.

7. A method according to claim 1, wherein the substitution management is conducted while at least one partition is divided into a plurality of alternative zones, and a plurality of primary defect list areas are arranged successively in said partition.

8. A method according to claim 1, wherein the substitution management is conducted while at least one partition is divided into a plurality of alternative zones, and an operation of fetching a primary defect list of an alternative zone in a partition which zone contains a recording and reproducing area of data is followed by an operation of fetching a primary defect list of another alternative zone which is in said partition and follows said alternative zone.

9. A method according to claim 1, wherein address information of an alternative sector to be used next in said primary spare area or secondary spare area is recorded in a header of said primary defect list or secondary defect list.

10. A method according to claim 1, wherein said information recording medium is rewritable for a limited number of times, alternative sectors the number of which is greater than the maximum number of defective sectors registrable in said primary defect list or secondary defect list are allocated in said primary spare area or secondary spare area, and, when one of said alternative sectors is defective, the record operation is executed using another one of said alternative sectors which has not been used.

11. A method according to claim 1, wherein said information recording medium cannot be rewritten. sectors, the number of which equals the number of defective sectors registrable in said primary defect list or secondary defect list, are allocated in said primary defect list area or secondary defect list area, the updation of said primary defect list or secondary defect list is executed employing successively unused sectors in said primary defect list area or secondary defect list area, the sequence of employing unused sectors beginning at one end of said primary defect list area or secondary defect list area, and using a primary defect list or secondary defect list fetched from a sector which is positioned immediately before said employed unused sector.

12. An apparatus for recording and reproducing information using a disk-shaped information recording medium in which the recording and reproducing of information are conducted in units of a sector, each sector being divided into one or more partitions, the file management being conducted in units of partition, comprising a means for allocating at least one primary alternative zone in said information recording medium, said alternative zone comprising: a prime area for recording user data, said prime area having a variable capacity which corresponds to the occurrence rate of defective sectors and to a user capacity allocated to a partition; a primary spare area for recording alternative sectors which substitute for defective sectors; and a primary defect list area for recording a primary defect list of a fixed length, said primary defect list holding the relationship between defective sectors and alternative sectors, a means for managing defective sectors in units of an alternative zone by substituting the defective sectors detected in said prime area with alternative sectors in said primary spare area, and by registering the defective sectors in said primary defect list, a means for allocating a secondary alternative zone in said information recording medium, said secondary alternative zone comprising: a secondary spare area for recording alternative sectors for substituting for defective sectors which overflow from said at least one primary alternative zone; and a secondary defect list area for recording a secondary defect list which holds the relationship between defective sectors and alternative sectors in said secondary spare area, a means for managing hierarchically defective sectors by substituting defective sectors which overflow from said at least one primary alternative zone, with alternative sectors in said secondary alternative zone, and by registering the defective sectors in said secondary defect list, and a means for managing all areas formed in the volume of said information recording medium by allocating a volume control area in said information recording medium, and by recording volume control data in said volume control area, said volume control data including control data of said at least one primary alternative zone, said partitions, said secondary alternative zone and an unused area.

13. An apparatus according to claim 12, wherein said volume control area is divided into a partition control area and an alternative zone control area, the partition control area including a partition control block holding control data necessary for the allocation of partitions and the recording and reproducing of a file, and the alternative zone control area including an alternative zone control block having control data necessary for the recording and reproducing of data including the allocation of partitions and the substitution of defective sectors.

14. An apparatus according to claim 13, wherein a defect control mode for identifying the operation mode of the defect management is recorded as one part of partition control data and alternative zone control data, thereby enabling the operation mode of the substitution management to be set in units of a partition.

15. An apparatus according to claim 12, wherein a volume control block for storing control data necessary for the operation of recording and reproducing data is generated to be recorded in said volume control area, said operation including the allocation of partitions, the recording and reproducing of a file, and the substitution of a defective sector.

16. An apparatus according to claim 15, wherein a defect control mode for identifying the operation mode of the defect management is recorded as one part of volume control data, thereby enabling the operation mode of the substitution management to be set in units of a partition.

17. An apparatus according to claim 12, wherein the substitution management is conducted while at least one partition is divided into a plurality of alternative zones, and a plurality of prime areas are arranged successively in said partition.

18. An apparatus according to claim 12, wherein the substitution management is conducted while at least one partition is divided into a plurality of alternative zones, and a plurality of primary defect list areas are arranged successively in said partition.

19. An apparatus according to claim 12, wherein the substitution management is conducted while at least one partition is divided into a plurality of alternative zones, and an operation of fetching a primary defect list of an alternative zone in a partition which zone contains a recording and reproducing area of data is followed by an operation of fetching a primary defect list of another alternative zone which is in said partition and follows said alternative zone.

20. An apparatus according to claim 12, wherein address information of an alternative sector to be used next in said primary spare area or secondary spare area is recorded in a header of said primary defect list or secondary defect list.

21. An apparatus according to claim 12, wherein said information recording medium is rewritable in a limited number of times, alternative sectors the number of which is greater than the maximum number of defective sectors registrable in said primary defect list or secondary defect list are allocated in said primary spare area or secondary spare area, and, when one of said alternative sectors is defective, the recording operation is executed using another one of said alternative sectors which has not been used.

22. An apparatus according to claim 12, wherein said information recording medium cannot be rewritten, sectors, the number of which equals the number of defective sectors registrable in said primary defect list or secondary defect list, are allocated in said primary defect list area or secondary defect list area, the updation of said primary defect list or secondary defect list is executed employing successively unused sectors in said primary defect list area or secondary defect list area, the sequence of employing unused sectors beginning at one end of said primary defect list area or secondary defect list area, and using a primary defect list or secondary defect list fetched from a sector which is from a sector which is positioned immediately before said employed unused sector.

* * * * *